United States Patent
Speicher et al.

(10) Patent No.: US 9,661,529 B2
(45) Date of Patent: May 23, 2017

(54) CONGESTION MITIGATION FOR ROAMERS

(71) Applicant: Cisco Technology, Inc., San Jose, CA (US)

(72) Inventors: Sebastian Speicher, Wallisellen (CH); Nirav Salot, Pune (IN); Konstantin Livanos, Naperville, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 20 days.

(21) Appl. No.: 14/639,489

(22) Filed: Mar. 5, 2015

(65) Prior Publication Data

US 2016/0262057 A1    Sep. 8, 2016

(51) Int. Cl.
| | |
|---|---|
| *H04W 28/24* | (2009.01) |
| *H04W 28/02* | (2009.01) |
| *H04W 72/04* | (2009.01) |
| *H04L 12/24* | (2006.01) |

(52) U.S. Cl.
CPC ......... *H04W 28/24* (2013.01); *H04L 41/5003* (2013.01); *H04W 28/0268* (2013.01); *H04W 28/0289* (2013.01); *H04W 72/0493* (2013.01)

(58) Field of Classification Search
CPC ............. H04W 28/24; H04W 28/0289; H04W 72/0493; H04W 28/02; H04W 36/14; H04W 28/0268; H04W 28/08; H04W 28/16; H04W 48/06; H04W 88/14; H04L 47/10
See application file for complete search history.

(56) References Cited

U.S. PATENT DOCUMENTS

| | | | | |
|---|---|---|---|---|
| 2014/0349689 | A1* | 11/2014 | Won ...... | H04W 60/04 455/458 |
| 2015/0036496 | A1* | 2/2015 | Shan ...... | H04W 88/06 370/235 |

(Continued)

OTHER PUBLICATIONS

"3GPP TS 23.401 V12.5.0 (Jun. 2014) Technical Specification: 3rd Generation Partnership Project; Technical Specification Group Services and System Aspects; General Packet Radio Service (GPRS) enhancements for Evolved Universal errestrial Radio Access Network (E-UTRAN) access (Release 12)," 3GPP, 650 Route des Lucioles—Sophia Antipolis, Valbonne—France; Jun. 2014, 305 pages.

(Continued)

*Primary Examiner* — Hirdepal Singh
(74) *Attorney, Agent, or Firm* — Patent Capital Group

(57) ABSTRACT

The present disclosure is directed at systems, methods and media for mitigating congestion for roamers in a wireless access network. In some embodiments, Radio Access Network (RAN) congestion information is reported from a base station to a RAN Congestion Awareness Function (RCAF) of a visited network. The RCAF can mitigate congestion by controlling Quality of Service (QoS) parameters for roaming User Equipment (UE) in a congested cell. The RCAF can further communicate with the Mobility Management Entity (MME) of the visited cell and the Policy Charging and Rules Function (PCRF) of the UE's home network. The RCAF can relieve congestion for roamers without informing the home network of the congestion at the cell.

22 Claims, 12 Drawing Sheets

(56) References Cited

U.S. PATENT DOCUMENTS

| | | | | |
|---|---|---|---|---|
| 2015/0103664 A1* | 4/2015 | Shan | .................... | H04W 24/10 370/235 |
| 2015/0195743 A1* | 7/2015 | Sirotkin | ............... | H04W 28/08 370/235 |
| 2015/0195746 A1* | 7/2015 | Franklin | ............... | H04W 28/22 370/230 |
| 2015/0365843 A1* | 12/2015 | Miklos | .............. | H04W 28/0289 370/235 |
| 2015/0382230 A1* | 12/2015 | Miklos | ............. | H04W 28/0247 370/230 |
| 2016/0029247 A1* | 1/2016 | Shan | ................. | H04W 36/0066 370/235 |
| 2016/0065456 A1* | 3/2016 | Muley | .................... | H04L 45/38 370/392 |
| 2016/0100326 A1* | 4/2016 | Chandramouli | ........ | H04W 8/26 370/241.1 |

OTHER PUBLICATIONS

EPO Jul. 8, 2016 Extended Search Report and Written Opinion from European Application Serial No. 16158840.5; 7 pages.

China Telecom, et al., "Clarification on RCAF Solution in Clause 6.1.5.5," 3GPP Draft; S2-141696 UPCON 6 1 5 5 V1, vol. SA WG2 $3^{rd}$ Generation Partnership Project, Mobile Competence Centre, 650 Route Des Lucioles, F-06921 Sophia-Antipolis Cedex France, May 19, 2014.

KDDI et al., "Coordination of Congestion Management for Non-Roaming and Roaming Traffic in UPCON," 3GPP Draft; S2-14115. vol. SA WG2, No. Malta; $3^{rd}$ Generation Partnership Project, Mobile Competence Centre, 650 Route Des Lucioles, F-06921 Sophia-Antipolis Cedex France, 5 pages.

\* cited by examiner

CONGESTION MITIGATION FOR ROAMERS

FIELD OF THE DISCLOSURE

This present disclosure relates generally to systems, methods, and media for providing congestion information and relief services in wireless network communications.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with several types of user equipment, including, for example, satellite communications systems, portable digital assistants (PDAs), laptop computers, and mobile devices (e.g., cellular telephones). One benefit that users of such devices can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, typically do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

Networking architectures, particularly in mobile wireless communication environments, have grown increasingly complex. Data traffic has grown extensively in recent years, which has significantly increased the demands on network resources. As the number of mobile subscribers increases, efficient management of communication resources becomes even more critical. In some instances, the volume of subscribers communicating on a network may cause network equipment to be overwhelmed, provide suboptimal performance or create congestion in the network. Accordingly, there are significant challenges in managing network resources, particularly for crowded systems.

DETAILED DESCRIPTION

Overview

Figure 1:
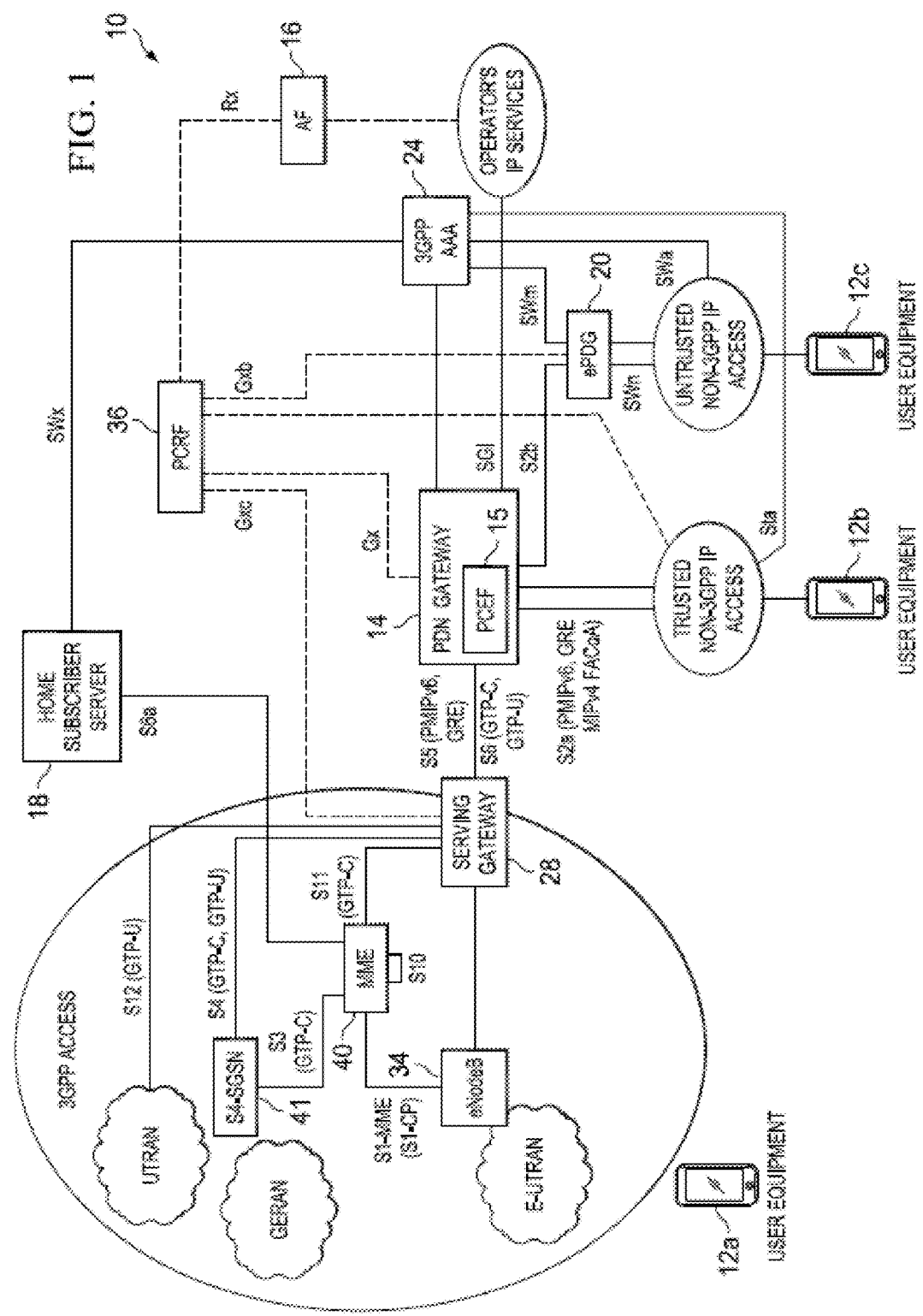
FIG. 1 is a schematic diagram showing the network nodes in an Evolved Packet Core (EPC) network, according to some embodiments.

In an embodiment, a network apparatus in a core network comprises one or more interfaces configured to communicate with user equipment (UE) via a wireless network and to communicate with a Mobility Management Entity (MME) node, and at least one processor in communication with the one or more interfaces, the at least one processor configured to collect, from an Operation and Management (OAM) node associated with the wireless network, congestion information related to the UE within a cell of the wireless network, determine, based on the collected congestion information, a congestion level associated with the wireless network cell, and send, to the MME, an indication of the determined congestion level associated with the cell of the wireless network, wherein the MME is configured to modify Quality of Service (QoS) parameters associated with the UE within the cell of the wireless network. The UE can further comprise a roaming UE. The MME can further modify the QoS parameters based on a policy table. Rhe QoS parameters can be one or more of UE Aggregated Maximum Bitrate (UE-AMBR), Access Point Name Aggregated Maximum Bitrate (APN-AMBR) for non-Guaranteed Bitrate (GBR) bearers, and Maximum Bitrate (MBR) for Guaranteed Bitrate (GBR) bearers. The network apparatus can further detect a change in the determined congestion level. The network apparatus can further send, to the MME, an indication of the detected change in determined congestion level. The MME can restore the QoS parameters to values active before the indication of congestion level. The MME can further modify the QoS parameters to values received from a PCRF associated with the UE.

In an embodiment, a method for relieving congestion in a cell of a wireless network comprises collecting from an OAM node associated with the wireless network, using a congestion collection component, congestion information related to UE within a cell of the wireless network, determining, based on the collected congestion information, using a congestion determination component, a congestion level associated with the wireless network cell, and sending, to the MME, using a congestion information transmission component, an indication of the determined congestion level associated with the cell of the wireless network, wherein the MME is configured to modify QoS parameters associated with the UE within the cell of the wireless network. The UE can further comprise a roaming UE. The MME is can be further configured to modify the QoS parameters based on a policy table. The QoS parameters can further comprise one or more of UE Aggregated Maximum Bitrate (UE-AMBR), Access Point Name Aggregated Maximum Bitrate (APN-AMBR) for non-Guaranteed Bitrate (GBR) bearers, and Maximum Bitrate (MBR) for Guaranteed Bitrate (GBR) bearers. The method can further comprise detecting a change in the determined congestion level. The method can further comprise sending, to the MME, an indication of the detected change in determined congestion level. The MME can be further configured to restore the QoS parameters to values active before the indication of congestion level. The MME can be further configured to modify the QoS parameters to values received from a PCRF associated with the UE.

In an embodiment, a computer readable storage medium having stored thereon, computer executable instructions that, if executed by a computer system cause the computer system to perform a method for relieving congestion in a cell of a wireless network, comprises collecting from an OAM node associated with the wireless network, using a congestion collection component, congestion information related to UE within a cell of the wireless network, determining, based on the collected congestion information, using a congestion determination component, a congestion level associated with the wireless network cell, and sending, to the MME, using a congestion information transmission component, an indication of the determined congestion level associated with the cell of the wireless network, wherein the MME is configured to modify QoS parameters associated with the UE within the cell of the wireless network. The UE can further comprise a roaming UE. The MME can further be configured to modify the QoS parameters based on a policy table. The method can further comprise detecting a change in the determined congestion level.

Description of Example Embodiments

An evolved packet core (EPC) network may include one or more cellular telephones or other mobile devices, called user equipment (UE); a radio transceiver/base station, called an eNodeB; a control node, called a mobile management entity (MME), which is responsible for tracking and paging the UE, as well as for selecting the serving gateway; a serving gateway (SGW), which routes and forwards user data packets and serves as a mobility anchor for the UE; a RAN Congestion Awareness Functions (RCAF), which determines whether a congestion level of a cell within a RAN; and a packet data network gateway (PGW), which provides connectivity for the UE to external packet data networks and performs policy enforcement and charging (PCEF). As well, other network nodes, such as a home subscriber server/authentication, authorization and accounting server (HSS/AAA server) and a policy charging and rules function (PCRF) server, may serve additional functions. Through the PGW, the EPC connects to applications such as voice telephony or public Internet data service, which may reside on an IP Multimedia Subsystem (IMS) network or on another IP network. Although an EPC network with EPS bearers and PDN gateways is described below, other types of networks may be used to implement the congestion relief services described below. Such other networks can also include base stations and gateways and have a core network, and may specifically include 3G networks.

The evolved packet core may use a Radio Access Network (RAN), e.g., EUTRAN, to provide its physical layer. EUTRAN stands for the Evolved Universal Terrestrial Radio Access Network. The underlying air interface uses orthogonal frequency division multiple access (OFDMA) technology to provide higher data rates and lower latency, and is optimized for packetized data traffic. User equipment (UE) attaches to an evolved NodeB (eNodeB) to access the network. In doing so, the UE requests radio resources from the eNodeB to establish a radio bearer. This design allows substantial numbers of UEs to communicate with an eNodeB over a single physical channel (i.e., the radio waves carried over the air).

Because the RAN communicates via radio waves carried through the air, the RAN has a finite capacity to carry non-overlapping radio signals, limiting the total amount of data that can be transmitted at a particular time. UEs communicating over the RAN are further limited to communicating only over frequencies licensed to a carrier by the Federal Communications Commission (FCC). Due to these technical constraints, UEs attached to eNodeBs must compete for channel capacity for their communications. When the volume of data passing between UEs and an eNodeB reaches a threshold level, RAN may experience congestion. The threshold for congestion on a network may vary, but generally congestion exists when a plurality of UEs cannot communicate with an eNodeB simultaneously due to saturation of the RAN. Congestion on a RAN may lead to undesirable effects such as loss of data, higher latency, and dropped calls, significantly hindering overall network performance. Over time, congestion relief methods have been developed to address these issues.

One solution to user-plane congestion mitigation (UPCON) provides for piggy-backing congestion information on top of uplink user-plane packets (i.e. uplink user data). Another solution suggests to report congestion via the existing GTP-C-based signaling plane. However, a different, off-path solution to the problem can be considered. In this solution, a new node, known as the RAN congestion awareness function (RCAF), can collect cell-level information from the RAN's Operation and Management (OAM) system and determine whether a given cell is congested or not. Once congestion has been detected by the RCAF, the Policy and Charging Rules Function (PCRF) can be informed, so that the PCRF can adapt the subscribers' QoS and charging policies to mitigate the congestion, e.g. by throttling certain application-specific traffic or activating video optimization.

The RCAF solution faces some difficulty dealing with inbound roamers (roamers that are visiting a given mobile network) due to the prevalence of home-routed roaming. Home-routed roaming refers to the PGW and PCRF being located in the home network's (HPLMN's) domain while SGW, MME, and the RAN are provided by the visited network (VPLMN). The entity that typically controls the policies (the PCRF) as well as the entity that is required to enforce those policies (PGW) are both located in the HPLMN. Thus, the VPLMN would have to inform the HPLMN that the VPLMN's RAN is congested. This leads to number of undesirable difficulties: operators are reluctant to reveal information about their network status to other operators; reporting of congestion information requires standardizing the meaning of the different congestion levels; the HPLMN does not know the typical traffic mix in the VPLMN and therefore cannot select a "useful" mitigation policy; and the VPLMN cannot trust the HPLMN to actually react to the congestion information and activate policies that would mitigate the congestion.

For these reasons, the VPLMN cannot rely on the HPLMN to activate congestion mitigation policies for inbound roamers. Currently, this would require that traffic of inbound roamers would not be throttled, causing inbound roamers to be treated "better" than a mobile network's "own" subscribers. Thus, there is a need for a solution to relieve congestion for inbound roamers.

In addition to the above, Local Break-Out (LBO) traffic may also become substantial based on demand for services available in the VPLMN. LBO refers to the PGW and visited PCRF (vPCRF) being located in the VPLMN's domain along with the SGW, MME and the RAN. The entity that typically controls the policies is the home PCRF (hPCRF) that is located in the HPLMN, which authorizes requests from the visited PCRF (vPCRF). Thus, also in the LBO model, the VPLMN would have to inform the HPLMN that the VPLMN's RAN is congested via the policy roaming interface between the vPCRF and hPCRF. The same problem exists for the local-break out roaming model.

FIG. 1 is a simplified block diagram illustrating a communication system 10 to facilitate communication for roamers and home subscribers in a network environment according to one embodiment of the present disclosure. This particular configuration may be tied to the 3rd Generation Partnership Project (3GPP) Evolved Packet System (EPS) architecture, also sometimes referred to as the Long-term Evolution (LTE) EPS architecture. Alternatively, the depicted architecture may be applicable to other environments equally.

The example architecture of FIG. 1 may include multiple end users operating user equipment (UE) 12a-12c and packet data network (PDN) gateway (PGW) 14, which has a logical connection to a serving gateway (SGW) 28. Also provided are a home subscriber server (HSS) 18, an Authentication, Authorization and Accounting (AAA) element 24 and an S4 serving gateway support node (S4-SGSN) element 41. PGW 14 may include a Policy and Charging Enforcement Function (PCEF) 15. SGW 28 has a logical connection to an eNodeB 34 and a Mobility Management Entity (MME) 40. SGW 28 also has a logical connection to S4-SGSN 41. Both SGW 28 and PGW 14 can interface with a Policy and Charging Rules Function (PCRF) 36. An Application Function (AF) 16 may interface with the PCRF 36. As discussed herein, the terms 'user equipment,' user' and 'subscriber' are interchangeable.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In more general terms, 3GPP defines the Evolved Packet System (EPS) as specified in TS 23.060, TS 23.401, TS 23.203, TS 29.060, TS 29.212, TS 29.274, etc. The EPS generally consists of UE access networks and an Evolved Packet Core (EPC). Access networks may be 3GPP access networks including legacy access networks such as GSM EDGE Radio Access Network (GERAN), UMTS Terrestrial Radio Access Network (UTRAN) or LTE access networks such as Evolved UTRAN (E-UTRAN), or they may be non-3GPP IP access networks such as digital subscriber line (DSL), Cable, WiMAX, code division multiplex access (CDMA) 2000, or wireless LAN (e.g., Wi-Fi).

Non-3GPP IP access networks can be divided into trusted and untrusted segments. For the trusted segment, a viable relationship exists between a service provider and the core network. Trusted IP access networks support mobility, policy, and AAA interfaces to the EPC, whereas untrusted networks do not. Instead, access from untrusted access networks is done via an evolved packet data gateway (ePDG) 20, which provides for IPsec security associations to the user equipment over the untrusted IP access network. The ePDG has a logical connection to the PCRF 36 and supports mobility, policy and AAA interfaces to the EPC, similar to the trusted IP access networks.

Also provided in the architecture of FIG. 1 is a series of interfaces, which can offer mobility, policy control, AAA functions and/or charging activities (offline and online) for various network elements. For example, interfaces can be used to exchange point of attachment, location, and/or access data for one or more end users, for example, users operating UE 12a-12c. Resource, accounting, location, access network information, network address translation (NAT) control, etc. can be exchanged using a remote authentication dial in user service (RADIUS) protocol or any other suitable protocol where appropriate. Other protocols that can be used in communication system 10 can include a Diameter protocol, service gateway interface (SGI), terminal access controller access-control system (TACACS), TACACS+, etc. RADIUS, Diameter and various interfaces related to communication for the protocols will be discussed in further detail below, as related to various embodiments of the present disclosure.

The EPC generally comprises an MME, an S4-SGSN, an SGW, a PGW (which may include a PCEF) and a PCRF. The components may be used to provide various UE services and/or functions and to implement QoS on packet flows. The services and functions may be used, for example, to provision voice over IP (VoIP) routing, enhanced services such as enhanced charging, stateful firewalls and/or traffic performance optimization (TPO). The MME is the primary control element for the EPC. Among other things, the MME provides for UE tracking and paging procedures including, for example, retransmissions, tracking area list management, idle mode UE tracking, etc. For example, the MME can maintain tracking information for UE regarding previous and current information for UE transitions between or within Radio Access Networks (RANs). The MME further provides for UE bearer procedures including activation, deactivation and modification; SGW and PGW selection for UE and authentication services. The SGW is a data plane element that can manage user mobility and interfaces with RANs. The SGW also maintains data paths between eNodeBs and the PGW. The PGW provides connectivity for UEs to external packet data networks, such as, for example an IP connectivity access network (IP-CAN). The S4-SGSN may provide access for legacy universal mobile telecommunications systems (UMTS) network devices. For example, UE on the GERAN can communicate through the S4-SGSN 41 to the SGW 28 or the PGW 14, which can include a gateway GPRS support node (GGSN) to support communication with legacy systems that may include GnGp-SGSNs.

Radio Access Networks (RANs) in an EPS architecture consist of eNodeBs (also known as eNBs). An eNodeB is generally connected directly to an EPC, as well as to adjacent eNodeBs. Connections with adjacent eNodeBs may allow calls to be routed more directly. An eNodeB is also responsible for selecting an MME for UE, managing radio resources, and making handover decisions for UE.

PCRF 36 may decide policy control and/or charging activities to apply to UE based on various Policy Charging and Control (PCC) rules. PCRF 36 can be configured to use user subscription information as a basis for the policy and charging control decisions. The subscription information may apply for both session-based and non-session based services. Additionally, PCRF 36 may determine PCC rules based on an application or service described to the PCRF from AF 16. PCRF 36 may be referred to generally as a policy server. AF 16 may describe applications/services to PCRF 36 that may require dynamic policy and/or charging control for one or more UE. The dynamic policy and/or charging controls may include, but not be limited to, controlling the detection for service data flows, setting charging instructions for service data flows, setting QoS levels for service data flows and/or gating. PCRF 36 may communicate PCC rules to PCEF 15 in PGW 14. PGW/PCEF 14/15 may serve as the policy enforcement point to manage QoS, online/offline flow-based charging, data generation, deep packet inspection and lawful intercept.

As shown in FIG. 1, a Diameter-based interface, Rx, may be maintained between AF 16 and PCRF 36 for communicating information between the AF 16 and PCRF 36. The PCRF 36 may provision PCC rules for the PCEF 15 (within PGW 14) using a Diameter-based Gx interface. Communication system 10 may be configured with additional Diameter interfaces to manage policy and control between various elements of the system 10. For example, Diameter interfaces, Gxa, Gxb and Gxc, may be maintained between the PCRF 36 and the trusted/non-trusted IP access points, the ePDG 20, and the SGW 28, respectively. Further Diameter interfaces, SWx, STa, SWa, and SWm may be maintained between the AAA element 24 and the HSS 18, the trusted non-3GPP IP access point, the untrusted non-3GPP access point, and the ePDG 20, respectively. Various additional Diameter interfaces may include S6a between the HSS 18 and the MME 40, S6b between the AAA element 24 and the PGW 14, and SWn between the ePDG 20 and the untrusted non-3GPP access point.

In operation, for example, UE 12a can attach to the network for purposes of establishing a communication session. UE 12a can communicate with eNodeB 34, which can further interact with MME 40 to complete some form of authentication for a particular user. MME 40 can interact with SGW 28, which interacts with PGW 14 such that a session can be setup between these components. The eNodeB 34 can interact with SGW 28 to provide data plane interactions for UE 12a Tunnels can be established at this juncture, and a suitable IP address can also be issued for this particular user. This process generally involves a default EPS bearer session being created for UE 12a. Dedicated bearer sessions can also be created for various services. Exemplary tunnel protocols such as GPRS tunneling protocol (GTP), which can be separated into control (GTP-C) signaling protocols and user data plane (GTP-U) protocols, are shown in FIG. 1 between various elements of communication system 10. As the session is established, PGW 14 can interact with PCRF 36 to identify policies associated with this particular user, such as a certain QoS setting, bandwidth parameter, latency setting, priority, billing, etc.

As the AF 16 updates services/applications described to the PCRF 36 during the session, dynamic policies may be applied to UE to effect various control and policy changes for UE.

Before detailing further operations and infrastructure of various elements of FIG. 1, certain contextual information is provided to offer an overview of some problems that may be encountered while applying dynamic policies for a group of subscribers (UE) in a network environment. Such information is offered earnestly and for teaching purposes only and, therefore, should not be construed in a way to limit the broad applications for the present disclosure.

UE 12a-12c can be associated with clients or customers wishing to initiate a flow in communication system 10 via some network. The terms 'user equipment', 'mobile node', 'end user', and 'subscriber' are inclusive of devices used to initiate a communication, such as a computer, a personal digital assistant (PDA), a laptop or electronic notebook, a cellular telephone, smartphone, tablet computer, an IP phone, or any other device, component, element, or object capable of initiating voice, audio, video, media, or data exchanges within communication system 10. UE 12a-c may also be inclusive of a suitable interface to the human user such as a microphone, a display, a keyboard, or other terminal equipment. UE 12a-c may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-c have a bundled subscription for network access and application services (e.g., voice), etc. Once the access session is established, the user can register for application services as well, without additional authentication requirements. There can be two different user data repositories (AAA databases): one for the access user profile and one for the application user profile. IP addresses can be assigned using dynamic host configuration protocol (DHCP), Stateless Address Auto-configuration, default bearer activation, etc., or any suitable variation thereof.

HSS 18 offers a subscriber database in 3GPP (e.g., GSM, LTE, etc.) environments. In one sense, HSS 18 can provide functions similar to those offered by an AAA element in a CDMA environment. When a user moves to 3GPP access, HSS 18 can be aware of this location and this anchor point (i.e., PGW 14). Additionally, HSS 18 can communicate with AAA element 24 such that when a UE moves to a CDMA environment, it still has an effective anchor for communications (i.e., PGW 14). HSS 18 and AAA element 24 can coordinate this state information for the UE (and synchronize this information) to achieve mobility. No matter how a UE moves, the access network element can be interacting with either HSS 18 or AAA element 24 in order to identify which PGW should receive the appropriate signaling. The route to a UE can be consistently maintained, where routing topology ensures that data is sent to the correct IP address. Thus, synchronization activity on the backend of the architecture allows mobility to be achieved for the user when operating in different environments. Additionally, in certain examples, PGW 14 performs home agent functions, and the trusted non-3GPP IP access network can provide packet data serving node (PDSN) functions in order to achieve these objectives.

In an embodiment, the operational functionality and services provided by SGW 28 and PGW 14 can be combined into a system architecture evolution gateway (SAE GW) (not shown), which can support combined SGW and PGW interfaces, signaling operations, functionality, services, etc. It is understood that the embodiments, process flows and use cases discussed in the present disclosure may be equally applied to communication networks that include an SAE GW.

Figure 2:
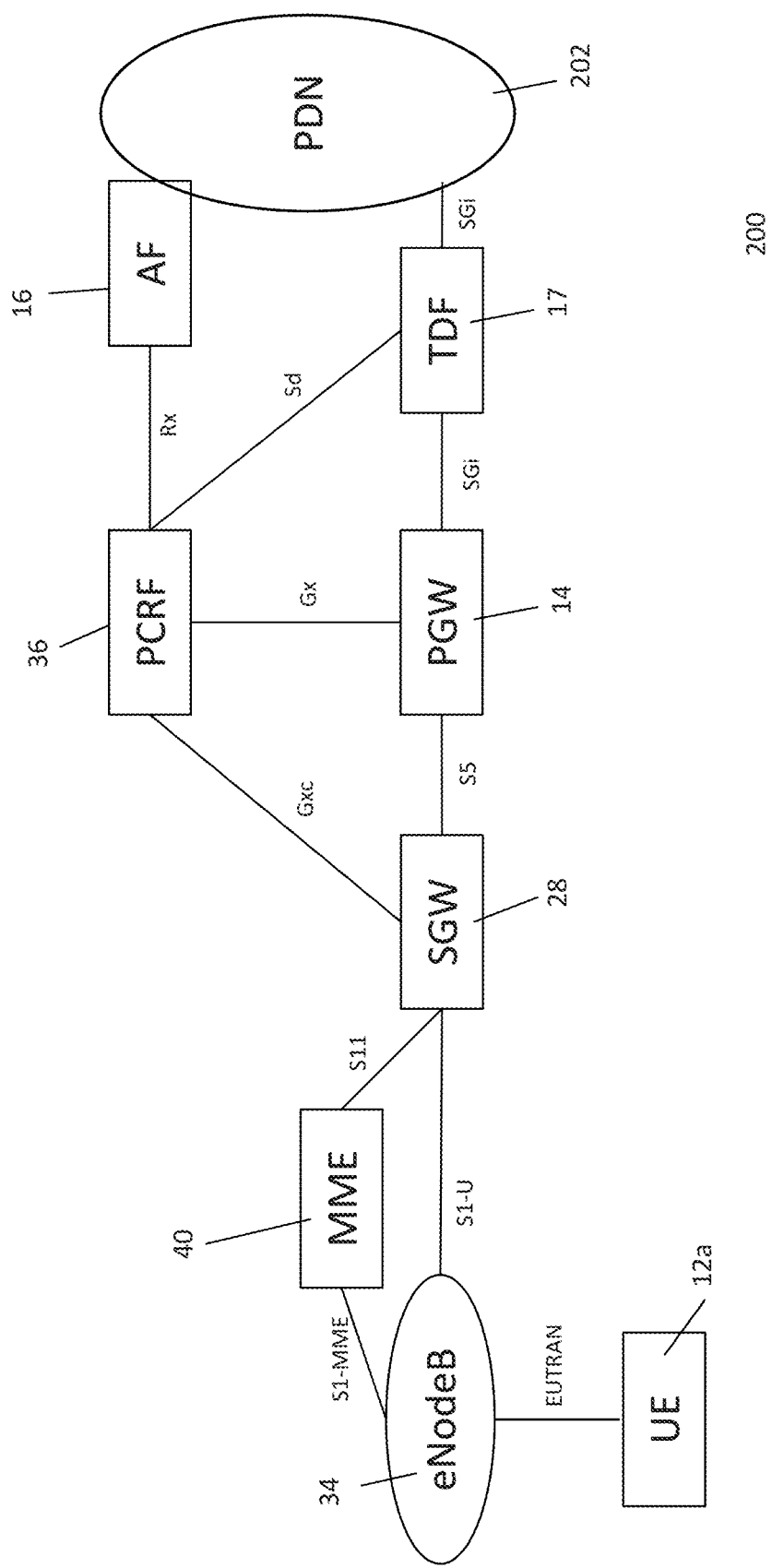
FIG. 2 is a schematic diagram showing a selection of network nodes in an EPC network, according to some embodiments.

FIG. 2 is an exemplary simplified block diagram illustrating communication between a UE and a network core according to one embodiment of the present disclosure. In FIG. 2, the UE, eNodeB, and the remainder of the network core all belong to the same network operator. FIG. 2 illustrates the system of FIG. 1 with a number of blocks omitted. However, though not shown, these blocks and others may be present in the system described in FIG. 2. FIG. 2 contains a UE 12a, an eNodeB base station 34, an SGW 28, a PGW 14, a PCRF 36, an AF 16, a Traffic Detection Function (TDF) 17, and an exit node connection to the packet data network (PDN) 202.

Various connections between the elements are depicted. eNodeB base station 34 can communicate with MME 40. In one embodiment, this connection can be realized over the S1-MME interface. In another embodiment, the connection between eNodeB base station 34 and MME 40 can be realized over the Iu interface. eNodeB base station 34 can also communicate with SGW 28 via the S1-U interface. MME 40 can communicate with SGW 28 over the S11 interface. SGW 28 can further communicate with PGW 14 via the S5 interface. Additionally, SGW 28 can communicate with PCRF 36 via the Gxc interface. PGW 14 can communicate directly with PCRF 36 via the Gx interface. PGW 14 can also communicate directly with TDF 17 via the SGi interface. PCRF 36 can communicate with AF 16 via the Rx interface. PCRF 36 may further communicate with TDF 17 via the Sd interface. TDF 17 may communicate directly with PDN 202 via the SGi interface.

UE 12a can be communicatively coupled to eNodeB base station 34. In one embodiment, this connection can be realized over EUTRAN. In another embodiment, the connection between UE 12a and eNodeB base station can be realized over UTRAN. As described in FIG. 1, UE 12a may couple to eNodeB 34 via simple interfaces using wired or wireless connections. Although only one UE 12a is illustratively shown in FIG. 2, it should be appreciated that many more UEs may communicate with eNodeB 34 simultaneously.

Figure 3:
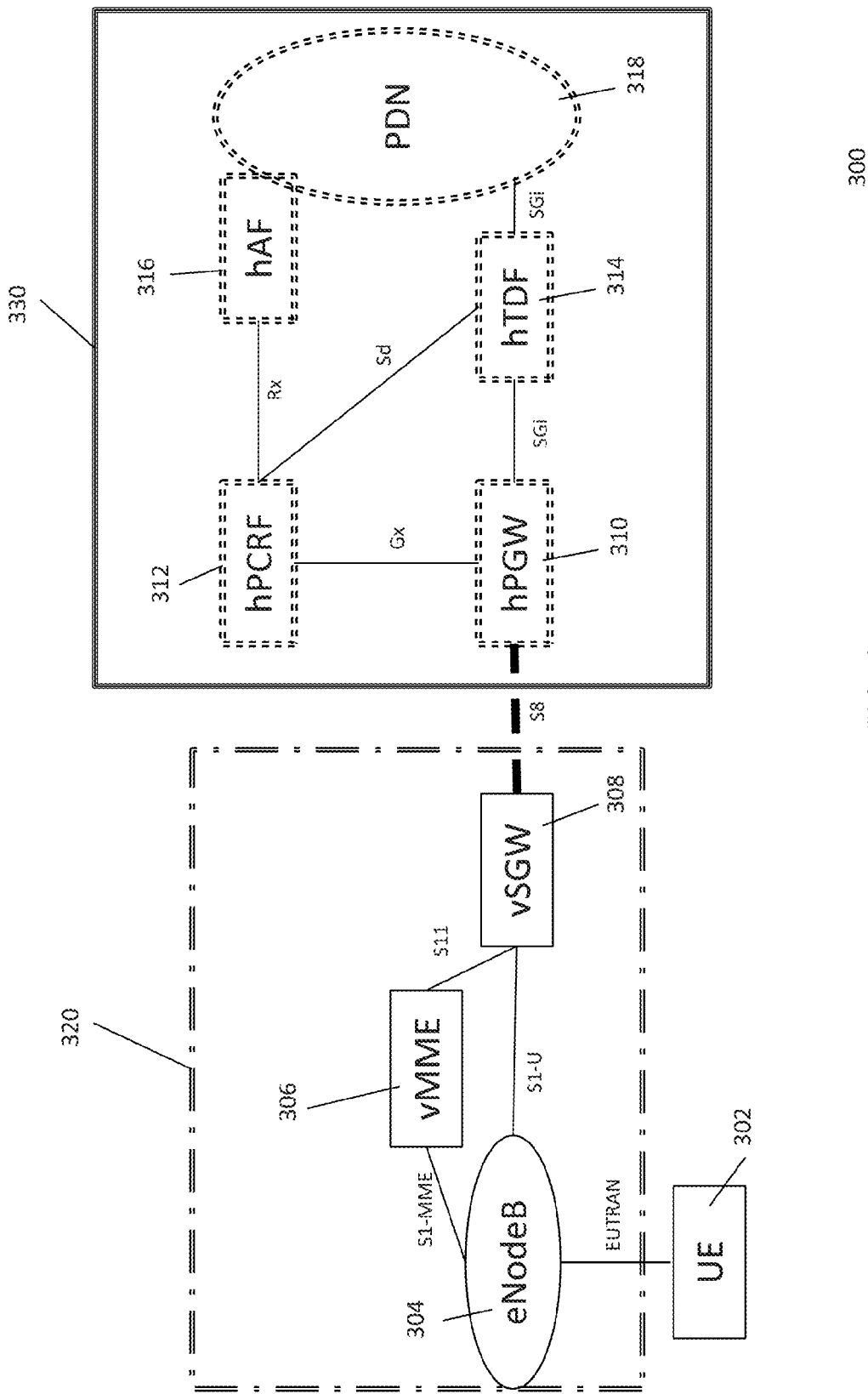
FIG. 3 is a schematic diagram showing a selection of network nodes associated with a roaming User Equipment (UE), according to some embodiments.

FIG. 3 is an exemplary simplified block diagram illustrating communication between a roaming UE 302, a visited network core 320, and a home network core 330 according to one embodiment of the present disclosure. In FIG. 3 the UE 302 is a roamer, and must communicate through visited network core 320 to reach the policy functions associated with its home network core 330. FIG. 2 contains a UE 302, visited network core 320, and home network core 330. Visited network core 320 further contains eNodeB 304, visited MME (vMME) 306, and visited SGW (vSGW) 308. Home network core 330 contains home PGW (hPGW) 310, home PCRF (hPCRF) 312, home TDF (hTDF) 314, home AF (hAF) 316, and PDN 318. Though not used in this data pathway, visited network core 320 and the home network core 330 will each further comprise all of the elements shown in FIG. 2.

In FIG. 3, UE 302 is a subscriber associated with the provider of home network core 330. During travel outside a coverage area, UE 302 can connect to eNodeB 304, which is associated with visited network core 320. When UE 302 connects to eNodeB 304, it can be considered a roamer. When a UE roams on a visited network, certain network functions can be handled by the visited network core 320, while other functions can be handled by home network core 330. As shown in FIG. 3, functions associated with an MME and SGW are respectively handled by the vMME 306 and the vSGW 308 of the visited network core. The remaining network functions associated with a PGW, PCRF, TDF, and AF can be handled respectively by hPGW 310, hPCRF 312, hTDF 314, and hAF 316 associated with the home network core 330.

In EUTRAN and UTRAN network cores, the PCRF (e.g., hPCRF 312) controls QoS parameters for a UE. Thus, the PCRF will typically make policy decisions regarding the congestion, and the associated PGW will enforce those decisions. In the situation illustrated in FIG. 3, when congestion is detected by the MME (e.g., vMME 306), the PCRF (e.g., hPCRF 312) can be informed of the congestion. In FIG. 3, vMME 306 can communicate an indication of congestion to hPCRF 312 via vSGW 308 and hPGW 310. Under this scenario, the visited network core 320 is forced to inform the home network core 330 associated with UE 302 that its cell is congested. Because the visited network would prefer not to disclose network congestion data to competing providers, an alternative solution is proposed.

Figure 4:
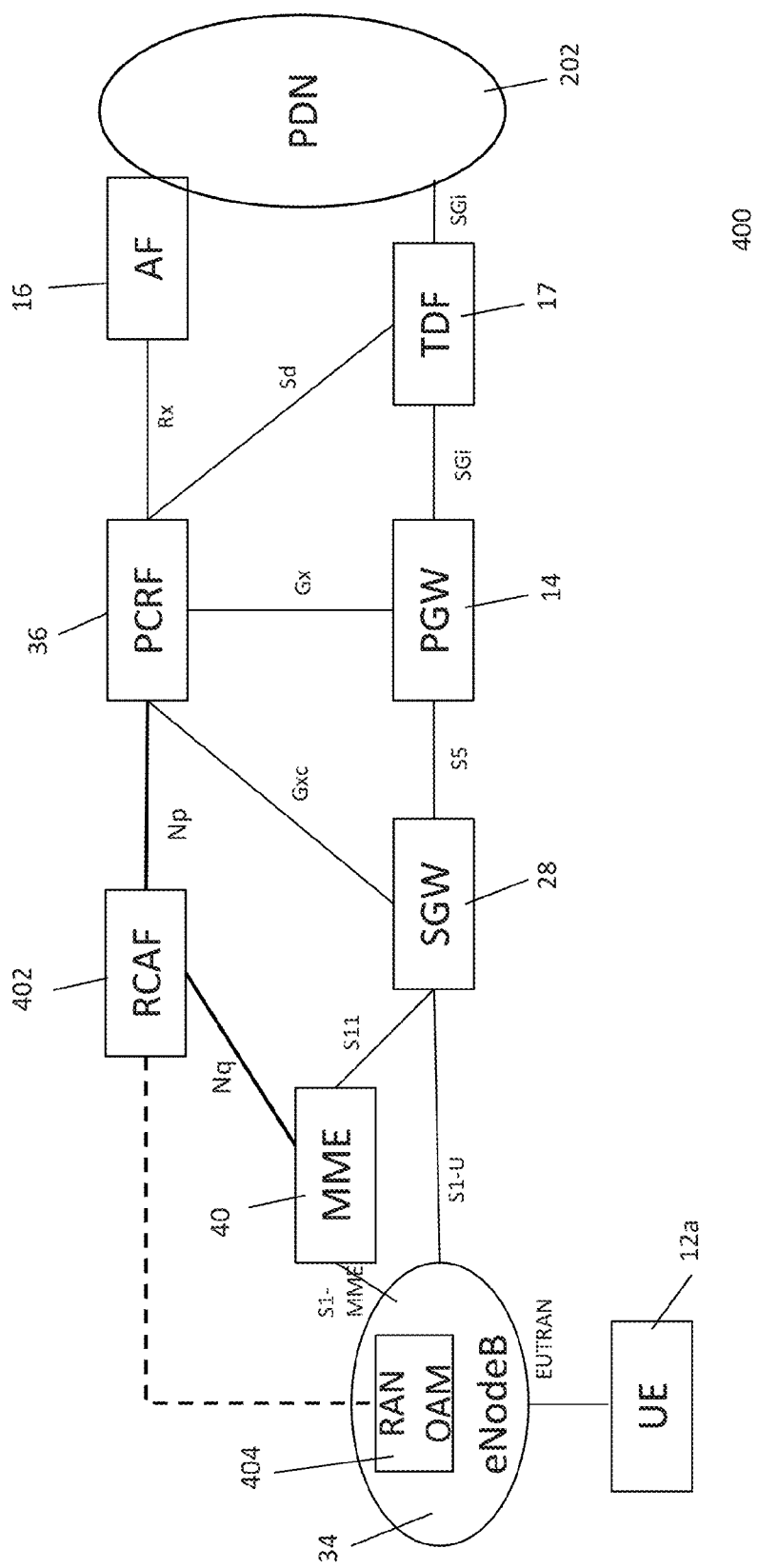
FIG. 4 is a schematic diagram showing operation of a Radio Access Network (RAN) Congestion Awareness Function (RCAF) in an EPC network, according to some embodiments.

FIG. 4 illustrates a network core 400 with enhanced RAN congestion mitigation. The network core 400 depicted in FIG. 4 is mostly identical to the network core 200 depicted in FIG. 2 and contains a UE 12a, an eNodeB base station 34, an SGW 28, a PGW 14, a PCRF 36, an AF 16, a Traffic Detection Function (TDF) 17, and an exit node connection to the packet data network (PDN) 202. However, FIG. 4 contains an additional node, the RAN Congestion Awareness Function (RCAF) 402, in place to handle congestion in the RAN network, and RAN Operation and Management (OAM) node 404 to determine cell-level congestion information. In addition, although not shown, eNodeB base station 34 can serve a congested cell with a substantial number of UEs.

RCAF 402 can be communicatively coupled with RAN OAM 404, with MME 40, and with PCRF 36. RCAF 402 can communicate with MME 40 over the Nq interface. RCAF 402 may further communicate with PCRF 36 over the Np interface. RAN OAM 404 can be attached to eNodeB base station 34 and communicatively coupled to RCAF 402.

The RCAF 402 can retrieve information about cell resource utilization from the RAN OAM system 404. For example, in FIG. 4, this information is retrieved directly from RAN OAM 404 attached to eNodeB 34. Based on this cell resource utilization information, the RCAF can determine whether the cell associated with eNodeB 34 (identified by, for example, its Evolved Cell Global Identifier (ECGI) or Serving Area ID (the "cell ID")) is congested. Upon determining that the cell is congested, the RCAF 402 can also determine a congestion level associated with the cell. The RCAF 402 can then communicate the cell ID of the congested cell over the Nq interface to MME 40.

MME 40 can determine a list of UEs being served by a cell associated with the cell ID received from the RCAF 402. MME 40 can also know which UEs associated with the cell served by eNodeB 34 are inbound roamers. For the inbound roamers amongst the UEs in the congested cell served by eNodeB 34, MME 40 can consult a locally configured policy table, which indicates QoS parameters to associate with a particular UE based upon the UE's home network identifier and a congestion level of the cell. Based on this, the MME 40 can modify the QoS parameters of active sessions of inbound roamers. Before modifying the QoS parameters, the MME 40 can locally store the previously active QoS parameters for a given session.

The policy table can include other information, e.g. the Access Point Name (APN), enabling the MME 40 to not apply QoS modification for specific APNs (e.g. the IP Multimedia System (IPN) APN). QoS parameters that can be modified based on the policy table include, for example, UE-Aggregated Maximum Bitrate (UE-AMBR), APN-AMBR for non-Guaranteed Bitrate (GBR) bearers, and Maximum Bitrate (MBR) for Guaranteed Bitrate Bearers. If the congestion state and/or the congestion level of a cell changes, the RCAF 402 can again inform the MME 40. Upon receiving updated congestion information, the MME 40 can modify the QoS parameters of active sessions of inbound roamers according to the new congestion state/level. If the congestion state of a cell changes back to being uncongested or if a UE moves from a congested to an uncongested cell, then the MME 40 can modify the QoS parameters of active sessions back to the stored values that were active before congestion was detected.

If the QoS parameters are being modified by PCRF 36 or PGW 14 while an inbound roamer is in a congested cell, then the MME 40 can store the new value. The QoS parameters of the session can also be modified, but can be capped as defined by the policy table.

Figure 5:
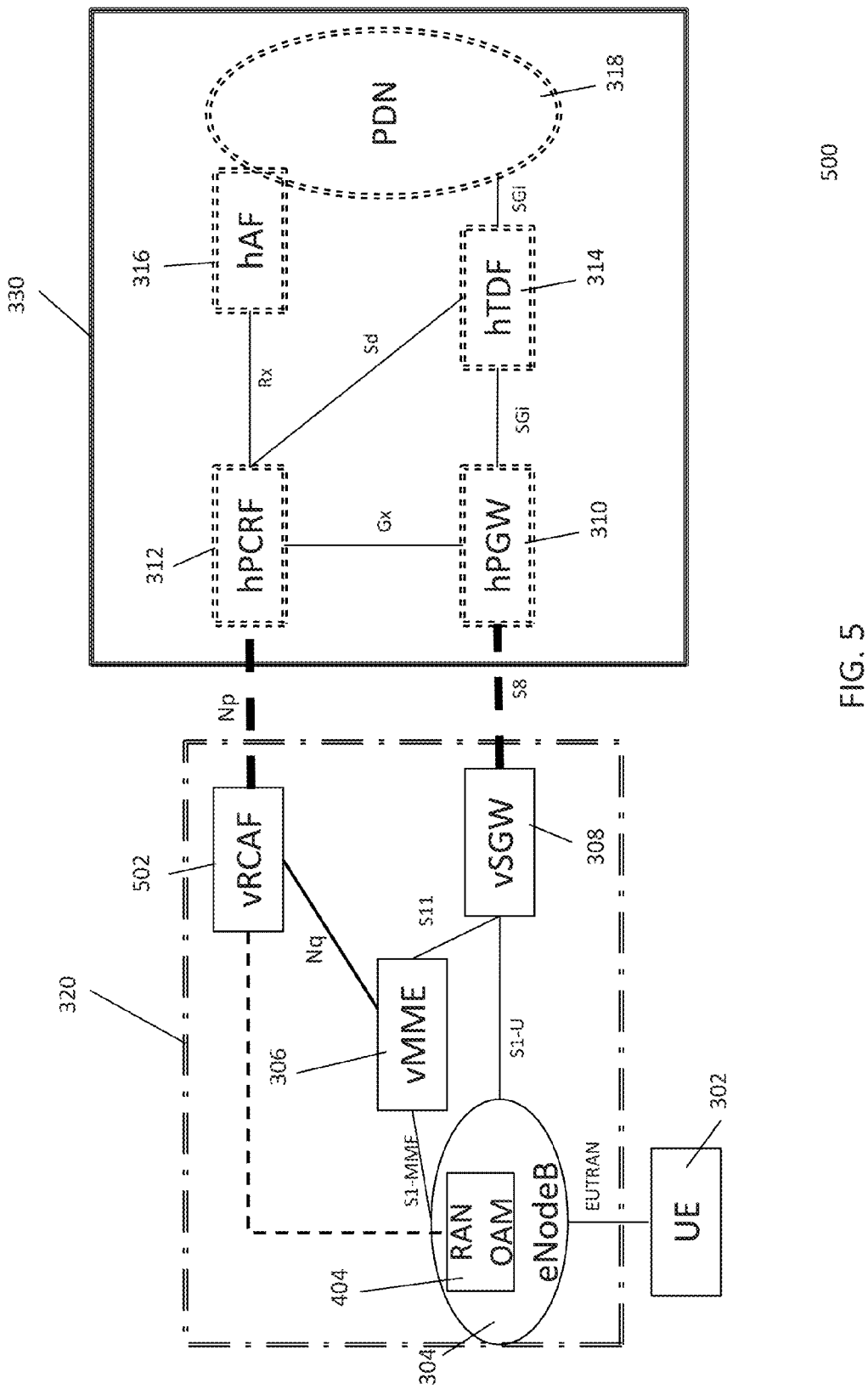
FIG. 5 is a schematic diagram showing a selection of network nodes including an RCAF associated with a roaming UE in an EPC network, according to some embodiments.

FIG. 5 is an exemplary simplified block diagram illustrating communication between a roaming UE 302, a visited network core 320, and a home network core 330 in a EUTRAN network according to one embodiment of the present disclosure. The network core 500 depicted in FIG. 5 is mostly identical to the network core 300 depicted in FIG. 3. In FIG. 5 the UE 302 is a roamer, and must communicate through visited network core 320 to reach the policy functions associated with its home network core 330. FIG. 3 contains a UE 302, visited network core 320, and home network core 330. Visited network core 320 further contains eNodeB 304, visited MME (vMME) 306, and visited SGW (vSGW) 308. Home network core 330 contains home PGW (hPGW) 310, home PCRF (hPCRF) 312, home TDF (hTDF) 314, home AF (hAF) 316, and PDN 318. Though not used in this data pathway, visited network core 320 and the home network core 330 will each further comprise all of the elements shown in FIG. 2. However, as in FIG. 4, FIG. 5 contains an additional node, the visited RAN Congestion Awareness Function (vRCAF) 502 in place to handle congestion in the RAN network.

vRCAF 502 can be communicatively coupled with eNodeB 304, with vMME 306, and with hPCRF 312. RCAF 502 can communicate with vMME 306 over the Nq interface. vRCAF 502 may further communicate with vPCRF 312 over the Np interface.

The vRCAF 502 can retrieve information about cell resource utilization from the RAN's OAM system 404. For example, in FIG. 5, this information is retrieved directly from RAN OAM 404. Based on this cell resource utilization information, the vRCAF 502 can determine whether the cell associated with eNodeB 304 is congested. Upon determining that the cell is congested, the vRCAF 502 can also determine a congestion level associated with the cell. The vRCAF 502 can then communicate the cell ID of the congested cell over the Nq interface to vMME 306.

vMME 306 can determine a list of UEs being served by a cell associated with the cell ID received from the vRCAF 502. vMME 306 can also know which UEs associated with the cell served by eNodeB 304 are inbound roamers. For the inbound roamers amongst the UEs in the congested cell served by eNodeB 304, vMME 306 can consult a locally configured policy table, which indicates QoS parameters to associate with a particular UE based upon the UE's home network identifier and a congestion level of the cell. Based on this, the vMME 306 can modify the QoS parameters of active sessions of inbound roamers. Before modifying the QoS parameters, the vMME 306 can locally store the previously active QoS parameters for a given session.

The policy table can include other information, e.g. the APN, enabling the vMME 306 to not apply QoS modification for specific APNs (e.g. the IP Multimedia System (IPN) APN). QoS parameters that can be modified based on the policy table include, for example, UE-Aggregated Maximum Bitrate (UE-AMBR), APN-AMBR for non-Guaranteed Bitrate (GBR) bearers, and Maximum Bitrate (MBR) for Guaranteed Bitrate Bearers. If the congestion state and/or the congestion level of a cell changes, the vRCAF 502 can again inform the vMME 306. Upon receiving updated congestion information, the vMME 306 can modify the QoS parameters of active sessions of inbound roamers according to the new congestion state/level. If the congestion state of a cell changes back to being uncongested or if a UE moves from a congested to an uncongested cell, then the vMME 306 can modify the QoS parameters of active sessions back to the stored values that were active before congestion was detected.

If the QoS parameters are being modified by hPCRF 312 or hPGW 310 while an inbound roamer is in a congested cell, then the vMME 306 can store the new value. The QoS parameters of the session can also be modified, but can be capped as defined by the policy table.

Figure 6:
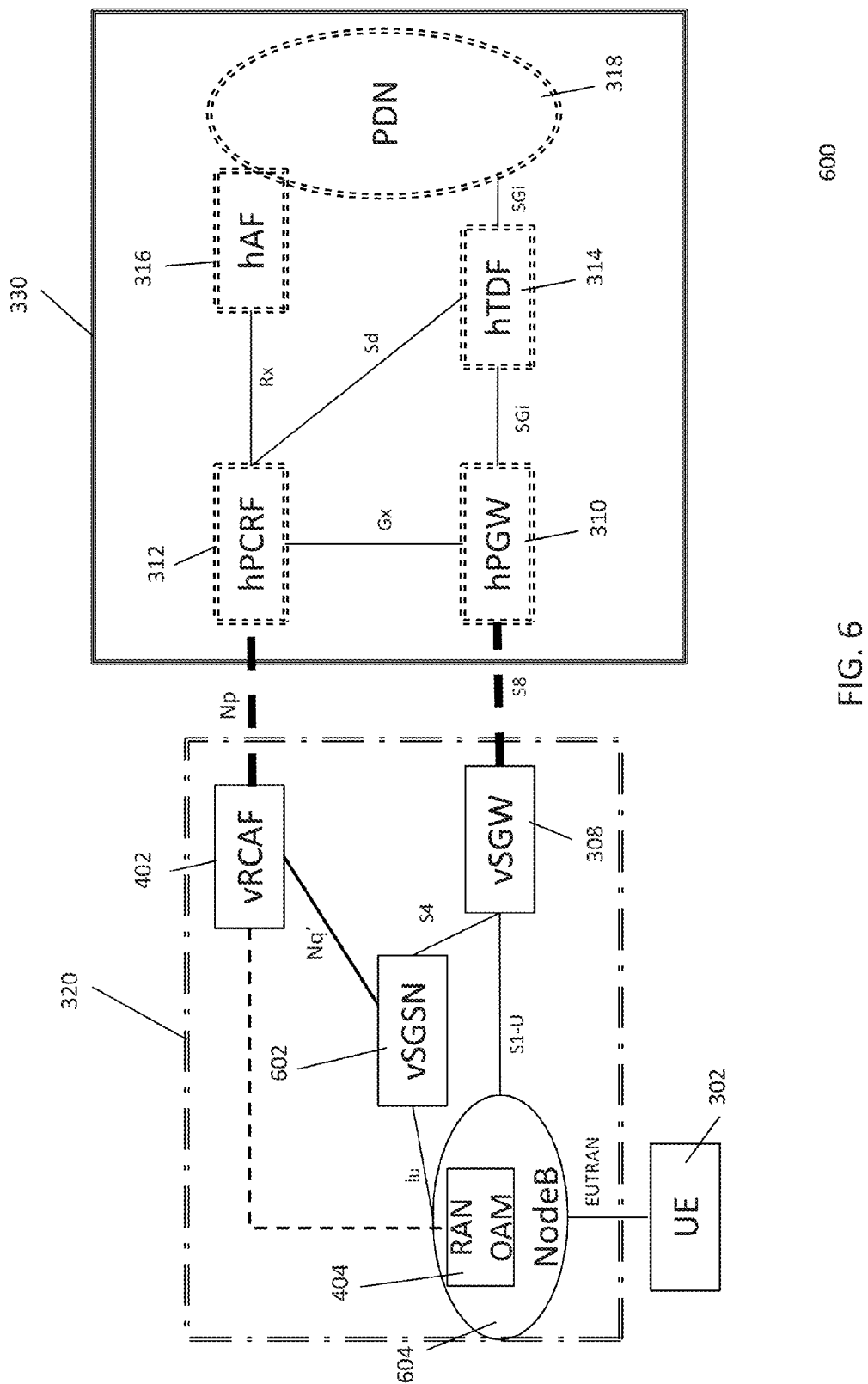
FIG. 6 is a schematic diagram showing a selection of network nodes including an RCAF associated with a roaming UE in a 3GPP network, according to some embodiments.

FIG. 6 is an exemplary simplified block diagram illustrating communication between a roaming UE 302, a visited network core 320, and a home network core 330 in a UTRAN network according to one embodiment of the present disclosure. The network core 600 depicted in FIG. 6 is mostly identical to the network core 500 depicted in FIG. 5. In FIG. 5 the UE 302 is a roamer, and must communicate through visited network core 320 to reach the policy functions associated with its home network core 330. FIG. 3 contains a UE 302, visited network core 320, and home network core 330. Visited network core 320 further contains NodeB 604, and visited SGW (vSGW) 308. Home network core 330 contains home PGW (hPGW) 310, home PCRF (hPCRF) 312, home TDF (hTDF) 314, home AF (hAF) 316, PDN 318, and vRCAF 502. However, FIG. 6 contains an alternative node, the vSGSN 602 in place of the vMME 506.

vRCAF 502 can be communicatively coupled with NodeB 604, with vSGSN 602, and with hPCRF 312. RCAF 502 can communicate with vSGSN 602 over the Nq interface. vRCAF 502 may further communicate with vPCRF 312 over the Np interface. The interactions between the nodes in FIG. 6 may be substantially the same as the interactions described in FIG. 5 above, where the vSGSN 602 takes the place of the vMME 306.

Figure 7A:
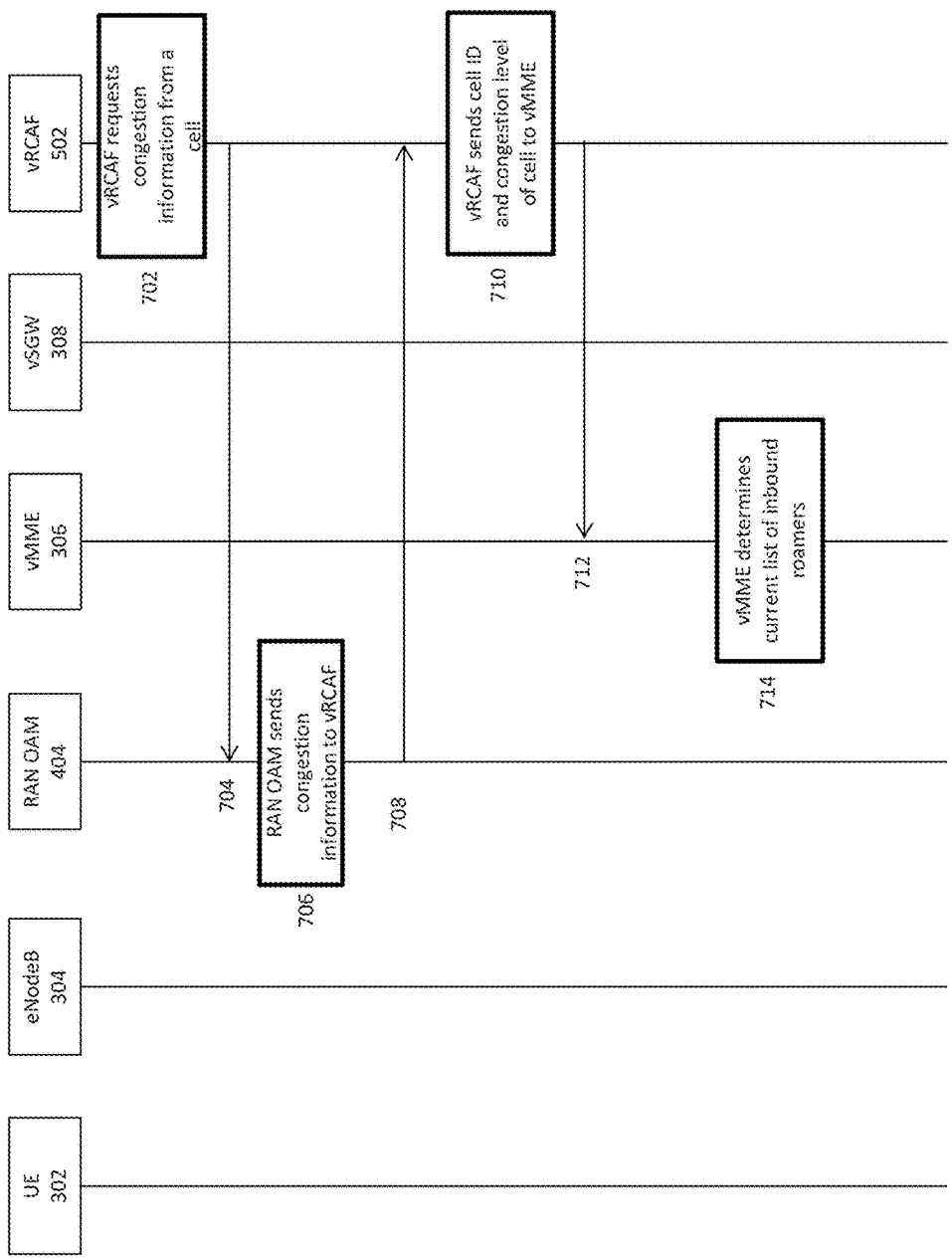
FIGS. 7A-7B are exemplary call flow diagrams illustrating a method for reporting of RAN congestion information according to some embodiments.
Figure 7B:
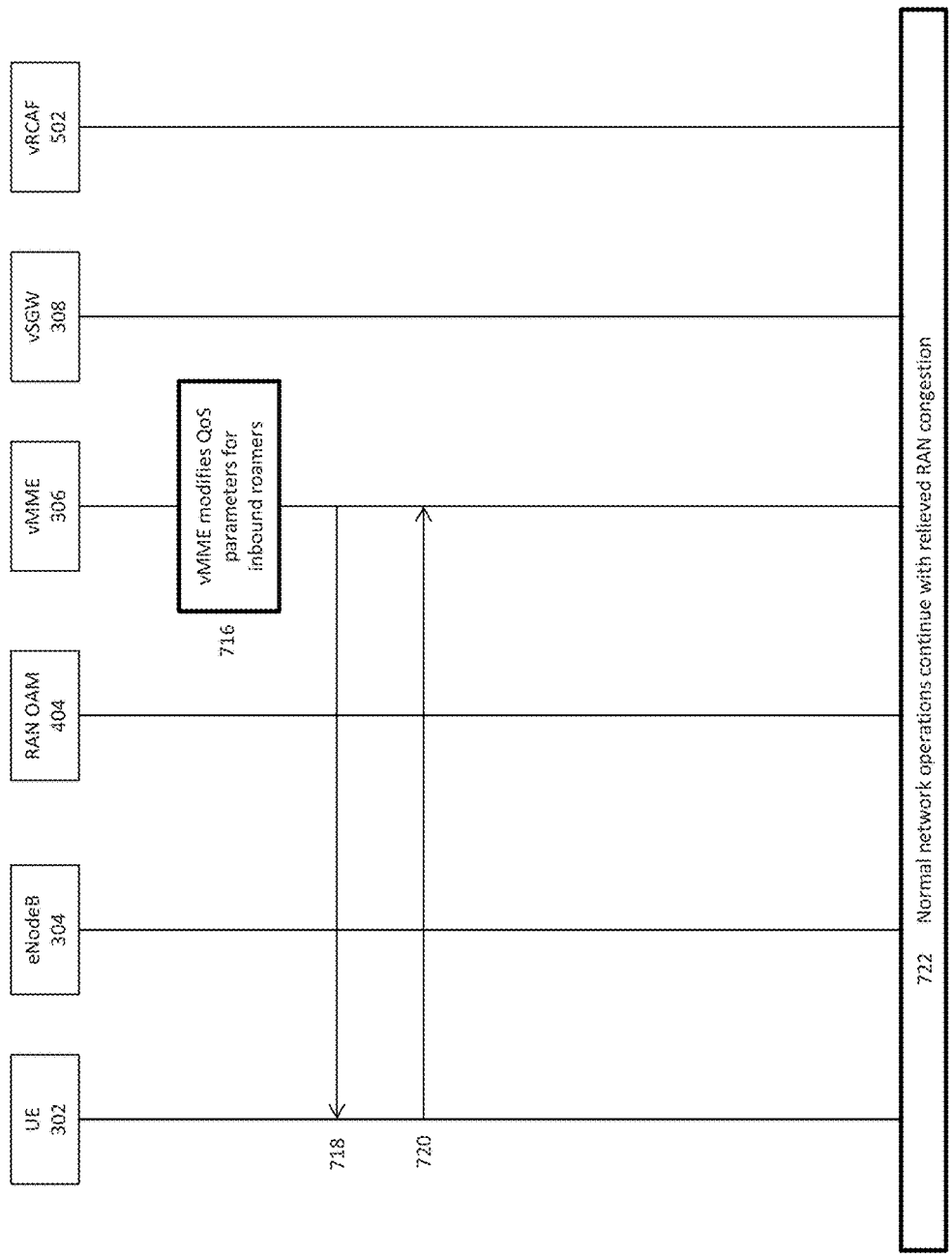

FIGS. 7A and 7B depict an exemplary packet flow for relief of congestion for inbound roamers according to some embodiments of the disclosure. The packet flow described in FIGS. 7A and 7B correspond to the flow through the structural elements provided in FIG. 5.

In FIG. 7A, vRCAF 502 may request congestion information from a cell, e.g., RAN OAM 404 (stage 702 and flow 704). RAN OAM 404 then may collect congestion information and provide the information to vRCAF 502 (stage 706 and flow 708). At stage 710, vRCAF 502 may determine the cell ID and congestion level associated with the cell, and the vRCAF may then send the information to its associated vMME 306 (flow 712). vMME 306 may then determine a current list of inbound roamers (stage 714).

In FIG. 7B, vMME 306 may modify QoS parameters for inbound roamers within the congested cell 304 (stage 306). The vMME 306 may communicate these new parameters to UE 12a (flows 718 and 720). At stage 722, normal network operations continue with reduced congestion for roamers.

Figure 8:
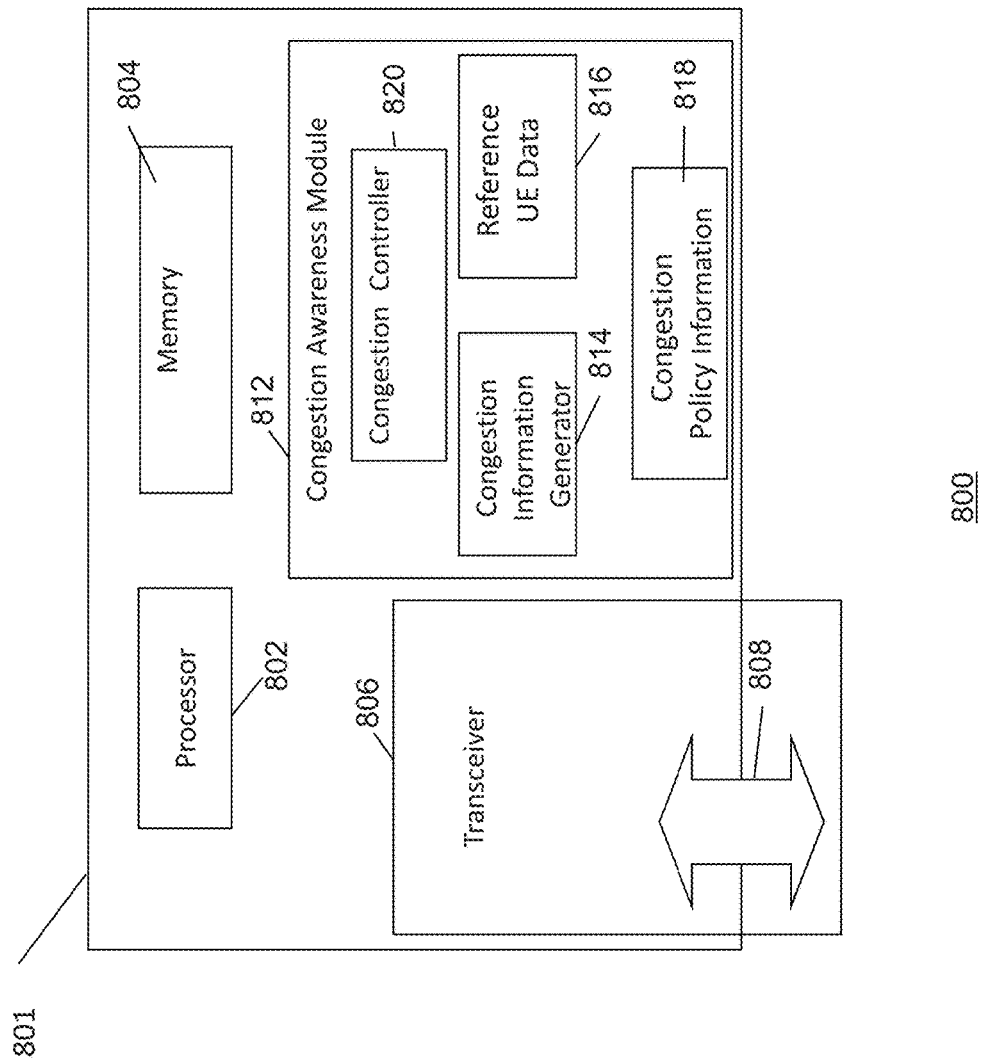
FIG. 8 is a logical diagram illustrating one implementation of an intermediary network node for implementing aggregated RAN congestion relief services, according to some embodiments.

FIG. 8 illustrates a logical view 800 of an intermediate network node 801 (such as vRCAF 502 or vMME 306) that implements congestion control services in accordance with certain embodiments. The intermediary node includes a transceiver 806 that implements an interface 808, a processor 802, a memory 804, and a congestion management module 812 that is provided using processor 802 and memory 804, wherein the congestion management module includes a congestion information generator 814, reference UE data 816, congestion policy information 818, and a congestion relief controller 820.

Interface 808 includes one or more physical connections that can be either wired or wireless to communicate information to and from intermediary network node 801. Intermediate network node 801 transmits and receives radio, electrical, optical or other data signals on interface 808 to and from access networks, to and from other network nodes (such as vSGW 308, or hPGW 310), and, in certain embodiments, to and from user equipment (such as UE 302). Processor 802 can be one or more integrated circuits that are multipurpose, programmable, clock-driven, register-based electronic devices that accept binary data as input, processes it according to instructions stored in its memory, and provides results as output. In some embodiments, processor 802 can be constructed for a specific purpose such as to provide callback services.

Memory 804 can be any type of computer readable medium such as random access memory (RAM), programmable read-only memory (PROM), a field programmable gate array (FPGA), flash memory, optical disk drive, or magnetic storage medium. Memory 804 can be used to store computer programs or logic that can be run on processor 802.

Processor 802 and memory 804 can be used to provide congestion management module 812, which includes congestion information generator 814, reference UE data 816, congestion policy information 818, and congestion controller 820. In some embodiments, congestion policy information 818 can comprise information stored in a table at vMME 806 that controls QoS parameters for inbound roamers. Congestion management module 812 can include information stored in memory 804 (such as congestion policy information 818) upon which action is taken by processor 802. In some embodiments, congestion management module 812 and its sub-components can be implemented as a module that is a combination of hardware and software—in these embodiments, congestion management module 812 may utilize its own dedicated processor and memory, or module 812 may utilize processor 802 and memory 804. In other embodiments, congestion management module 812 can be implemented only as software which is stored in memory 804 and run on processor 802.

Congestion management module 812 can include congestion controller 820, which can be responsible for generating new QoS parameters for UEs that are inbound roamers. In some embodiments, congestion controller 820 can base its determination on information received from other network nodes (e.g., eNodeB 304). Congestion controller 820 can also be responsible for determining when network node 801 should modify QoS parameters for inbound roamers, e.g., UE 302.

Figure 9:
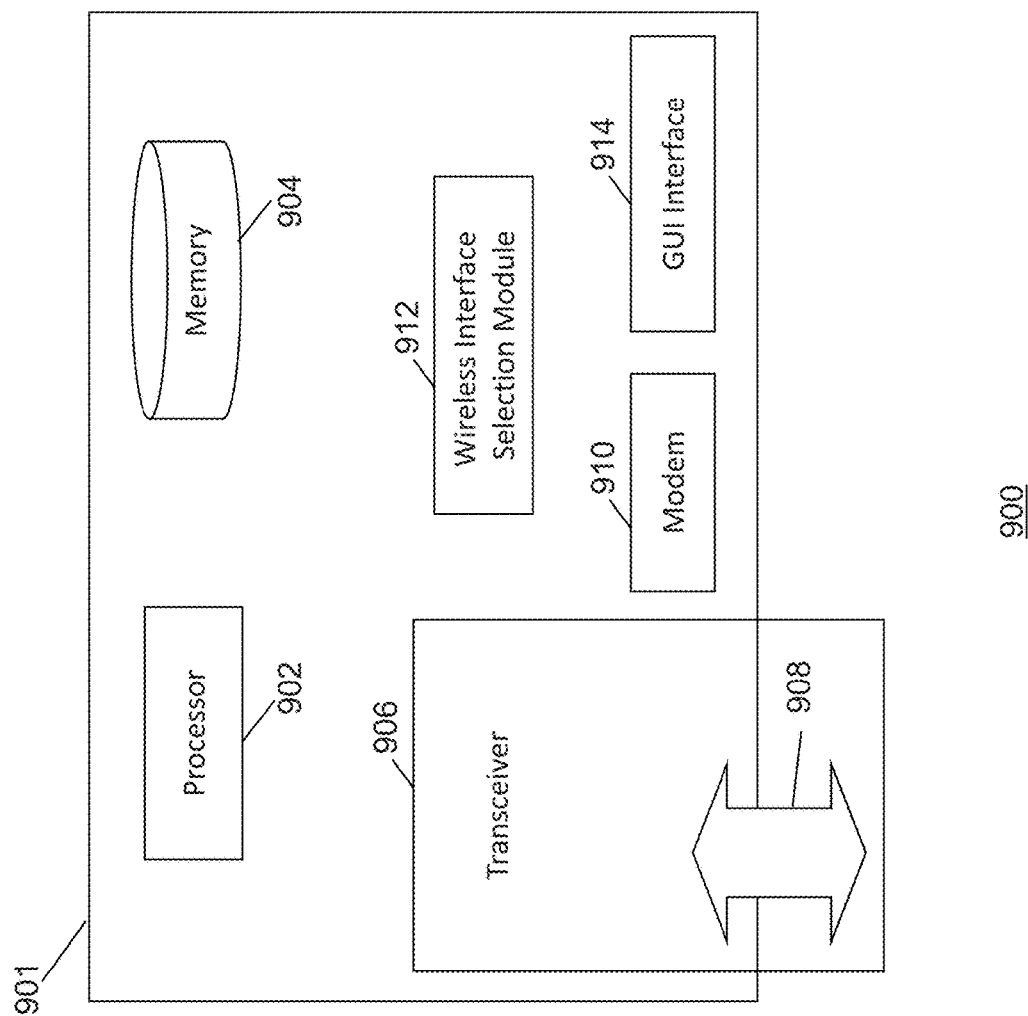
FIG. 9 is a logical diagram illustrating one implementation of a UE, according to some embodiments.

FIG. 9 illustrates a logical view 900 of user equipment (UE) 302 in accordance with certain embodiments. The UE 302 can include a processor 902, a memory 904, a transceiver 906 including an interface 908, a modem 910, a wireless interface selection module 912, and a GUI interface 914.

The transceiver 906 includes a transmitter and a receiver. The transmitter and the receiver can be integrated into a single chip or can be embodied in separate chips. The transceiver 906 can also include an interface 908 that provides an input and/or output mechanism to communicate with other network devices. The interface 908 can measure the wireless signal strengths of wireless interfaces such as base stations and access points. The interface 908 can be implemented in hardware to send and receive signals in a variety of mediums, such as optical, copper, and wireless, and in a number of different protocols some of which may be non-transient.

The modem 910 is configured to implement modulation and framing of signals according to one or more communication standards. The communication standards include the cellular standards defined under 3GPP.

The wireless interface selection module 912 is configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 912 can select the serving wireless interface by analyzing data load information associated with wireless interfaces. In certain embodiments, the wireless interface selection module 912 can be configured to attach to a wireless interface handling the least amount of data traffic and/or with more available resources. In certain embodiments, the wireless interface selection module 912 can also analyze additional information to decide to which wireless interface to connect. For example, the wireless interface selection module 912 can use one or more of the following: the load condition associated with the candidate wireless interfaces, the wireless signal strength associated with the candidate wireless interfaces, and a configuration status on the wireless interface selection module 912 indicating whether the UE 302 favors the cellular network or the WLAN.

The wireless interface selection module 912 can be implemented in software using memory 904 such as a non-transitory computer readable medium, a programmable read only memory (PROM), or flash memory. In some embodiments, the memory 904 can be used to implement the table 902 depicted in FIG. 9, which keeps track of which application or QoS corresponds to a particular reference cookie. The software can run on a processor 902 that executes instructions or computer code. The wireless interface selection module 912 may also be implemented in hardware using an application specific integrated circuit (ASIC), programmable logic array (PLA), or any other integrated circuit.

The GUI interface 914 can provide communication with an input and/or output mechanism to communicate with UE users. UE users can use input/output devices to send/receive data to/from the UE 302 over the GUI interface 110. Input/output devices can include, but are not limited to, a keyboard, a screen, a touch screen, a monitor, and a mouse. The GUI interface 914 can operate under a number of different protocols. The GUI interface 914 can be implemented in hardware to send and receive signals in a variety of mediums, such as optical, copper, and wireless.

The UE 302 described above can communicate with a plurality of radio access networks using a plurality of access technologies and with wired communication networks. The UE 302 can be a smart phone offering advanced features and capabilities, such as word processing, web browsing, gaming, e-book capabilities, an operating system, and a full keyboard. The UE 302 may run an operating system such as Symbian OS, iPhone OS, RIM's Blackberry, Windows Mobile, Linux, Palm WebOS, and Android. The screen may be a touch screen that can be used to input data to the UE 302 and the touch screen can be used instead of the full keyboard. The UE 302 may have the capability to run applications or communicate with applications that are provided by servers in the communication network. The UE 302 can receive updates and other information from these applications on the network.

The UE 302 also encompasses many other devices such as televisions (TVs), video projectors, set-top boxes or set-top units, digital video recorders (DVR), computers, netbooks, laptops, and any other audio/visual equipment that can communicate with a network. The UE 302 can also keep global positioning coordinates, profile information, or other location information in its stack or memory. The UE 302 can have a memory such as a computer readable medium, flash memory, a magnetic disk drive, an optical drive, a programmable read-only memory (PROM), and/or a read-only memory (ROM). The UE 302 can be configured with one or more processors 902 that process instructions and run software that may be stored in memory 904. The processor 902 can also communicate with the memory 904 and interfaces to communicate with other devices. The processor 902 can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 302 can also provide a variety of user interfaces (e.g., GUI Interface 914) such as a keyboard, a touch screen, a trackball, a touch pad, and/or a mouse. The UE 302 may also include speakers and a display device in some embodiments.

Any of the network components specified in this disclosure, including PGW 14 and PCRF 36 (any of which can be implemented as or in combination with intermediate network node 801 depicted in FIG. 8), can be implemented, at least in part, in a network device in some embodiments. This network device can implement multiple and different integrated functionalities. In some embodiments, one or more of the following additional functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. If the network device is serving as a gateway, the gateway can be implemented as any combination of the following: an xGSN, an xGW, an xGW-SGW, and an xGW-PGW.

Figure 10:
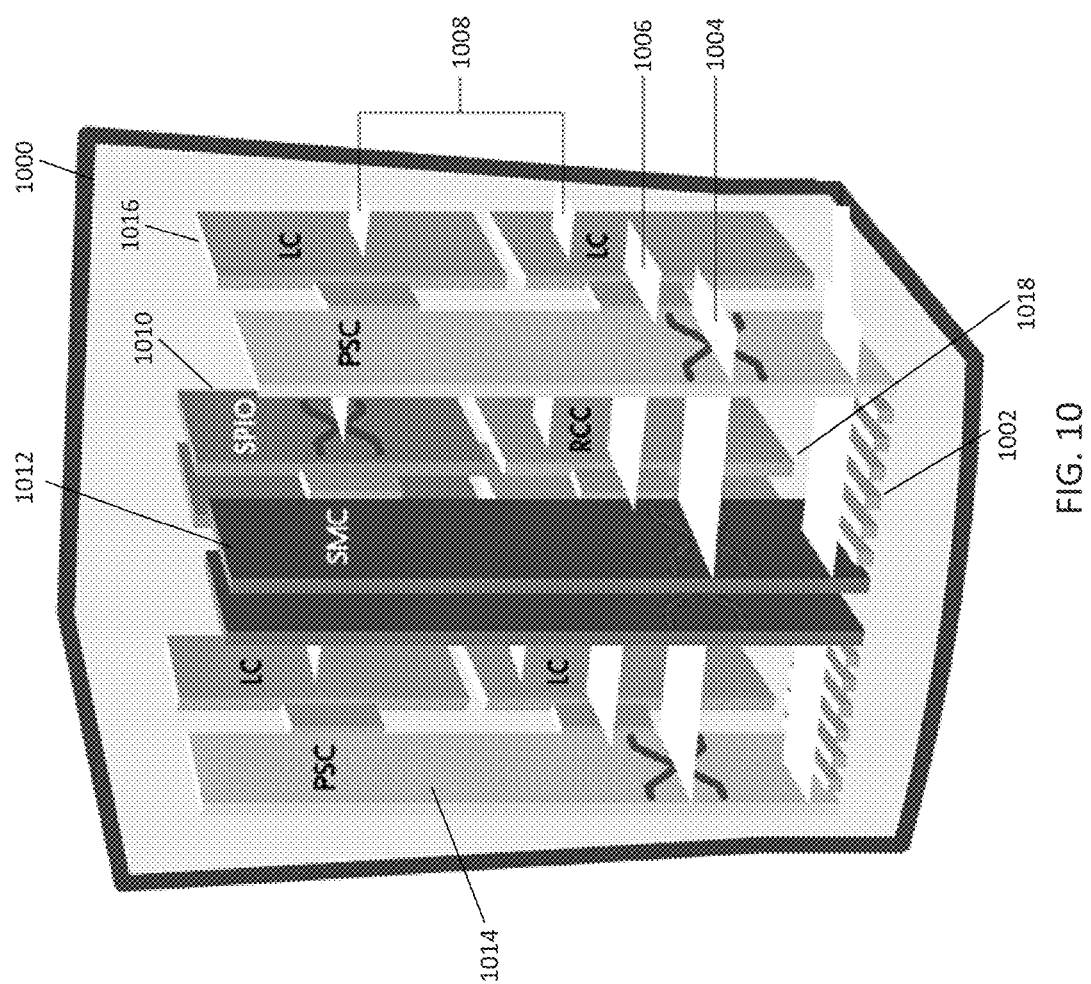
FIG. 10 illustrates the implementation of a network device, according to some embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 10 illustrates the implementation of a network device 1000 in accordance with some embodiments. The network device 1000 includes slots 1002 for loading application cards and line cards. A midplane can be used in the network device 1000 to provide intra-network device communications, power connections, and transport paths between the various installed cards. The midplane can include buses such as a switch fabric 1004, a control bus 1006, a system management bus, a redundancy bus 1008, and a time division multiplex (TDM) bus. The switch fabric 1004 is an IP-based transport path for user data throughout the network device 1000 implemented by establishing inter-card communications between application cards and line cards. The control bus 1006 interconnects the control and management processors within the network device 1000. The network device management bus provides management of system functions such as supplying power, monitoring temperatures, board status, data path errors, card resets, and other failover features. The redundancy bus 1008 provides transportation of user data and redundancy links in the event of hardware failures. The TDM bus provides support for voice services on the system.

The network device 1000 supports at least four types of application cards: a switch processor I/O card (SPIO) 1010, a system management card (SMC) 1012, a packet service card (PSC) 1014, and a packet accelerator card (not shown). Other cards used in the network device 1000 include line cards 1016 and redundant crossbar cards (RCC) 1018. The line cards 1016, when loaded in the network device 1000, provide input/output connectivity to the network and other devices, as well as redundancy connections. The line cards 1016 include interfaces to the network through Ethernet, Fiber Optic, and/or any other communication mediums. The redundant crossbar card (RCC) 1018 includes a non-blocking crossbar and connections to each of the cards in the network device 1000. This allows a redundant connection to be made through the redundant crossbar card 1018 from any one card to any other card in the network device 1000. The SPIO card 1010 serves as a controller of the network device 1000 and is responsible for such things as initializing the network device 1000 and loading software configurations onto other cards in the network device 1000.

The system management card (SMC) 1012 and switch processor card (not shown) are system control and management cards for managing and controlling other cards in the network device 1000. The packet accelerator card (PAC) and packet service card (PSC) 1014 provide packet processing, context processing capabilities, and forwarding capabilities among other things. The PAC and PSC 1014 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device 1000 such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The software in the network device 1000 can be divided into a series of tasks that perform specific functions. These tasks communicate with each other as needed to share control and data information throughout the network device 1000. A task is a software process that performs a specific function related to system control or session processing. Three types of tasks operate within the network device 1000 in some embodiments: critical tasks, controller tasks, and manager tasks. The critical tasks control functions that relate to the ability of the network device 1000 to process calls such as network device initialization, error detection, and recovery tasks. The controller tasks mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device (e.g., network device 1000) include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node (e.g., user equipment 302), the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 11:
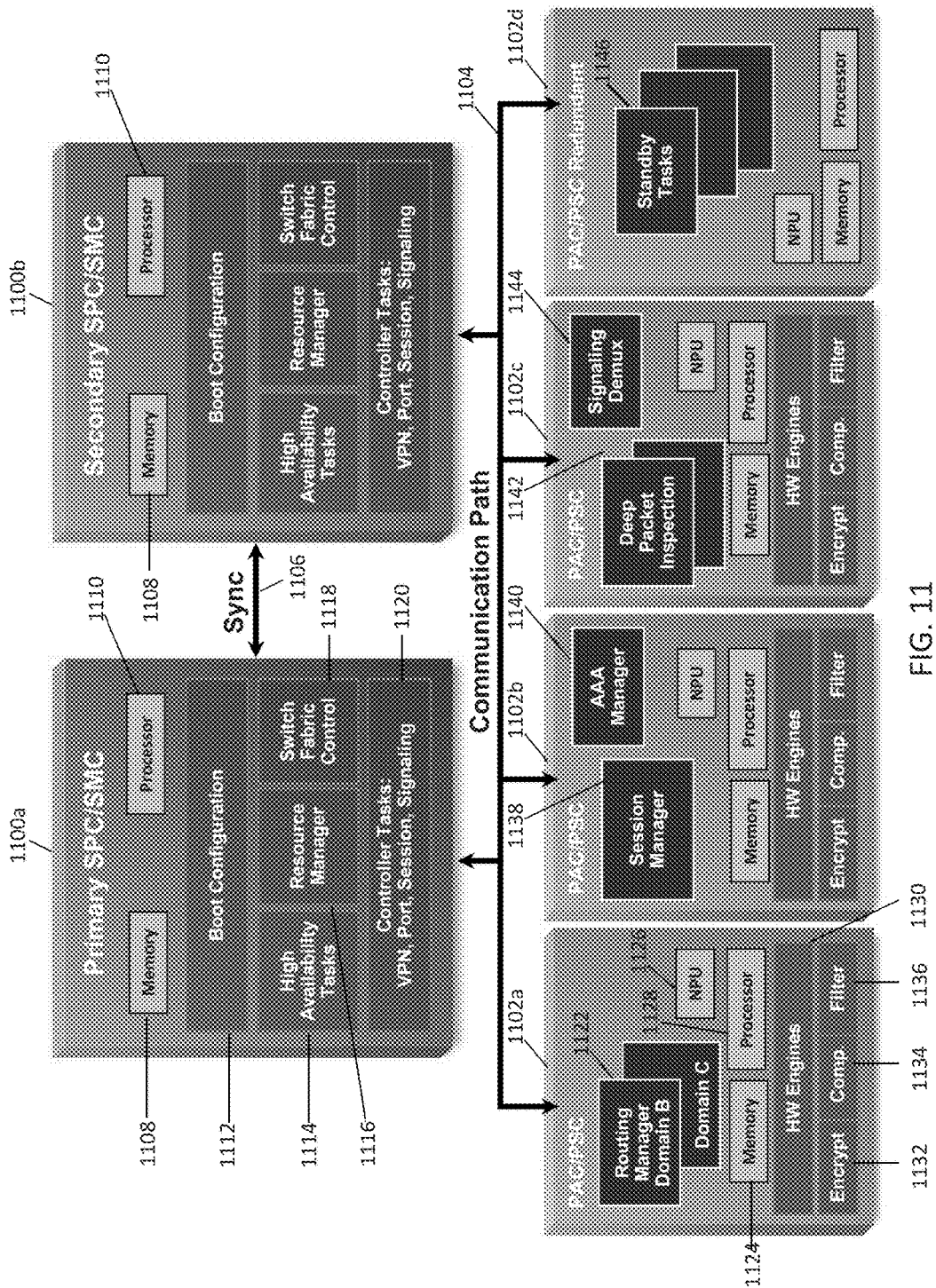
FIG. 11 is a logical view of the software architecture of a network device, according to some embodiments.

FIG. 11 illustrates a logical view 1100 of the software architecture of a network device (e.g., network device 1100) in accordance with certain embodiments. As shown, the software and hardware can be distributed within the network device and across different circuit boards, processors, and memory. FIG. 11 includes a primary switch processor card (SPC)/system management card (SMC) 1100a, a secondary SPC/SMC 1100b, PAC/PSC 1102a-1102d, a communication path 1104, and a synchronization path 1106. The primary SPC/SMC 1100a and the secondary SPC/SMC 1100b each includes a memory 1108, a processor 1110, a boot configuration 1112, high availability tasks 1114, resource manager 1116, switch fabric control 1118, and controller tasks 1120.

The SPC/SMC 1100 (both primary and secondary) manages and controls the network device including the other cards in the network device. The SPC/SMC 1100 can be configured in a primary and secondary arrangement that provides redundancy and failsafe protection. The modules or tasks running on the SPC/SMC 1100 are related to network device wide control and management. The boot configuration task 1112 includes information for starting up and testing the network device. The network device can also be configured to startup in different configurations and providing different implementations. These can include which functionalities and services are capable of running on the SPC/SMC 1100. The high availability task 1114 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 1100 or a PAC/PSC 1102, while some processor intensive tasks can also be performed across multiple PACs/PSCs to utilize multiple CPU resources. Distribution of these tasks is invisible to the user. The switch fabric control 1118 controls the communication paths in the network device. The controller tasks module 1120 can manage the tasks among the resources of the networks to provide, for example, VPN services, assign ports, and create, delete, and modify sessions for UE 302.

The PAC/PSC 1102 is a high-speed processing card that is designed for packet processing and the tasks involved with providing various network functionalities on the network device. The PAC/PSC 1102 include a memory 1124, a network processing unit (NPU) 1126, a processor 1128, a hardware engine 1130, an encryption component 1132, a compression component 1134, and a filter component 1136. Hardware engines 1130 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 1102 is capable of supporting multiple contexts. The PAC/PSC 1102 is also capable of running a variety of tasks or modules. PAC/PSC 1102a provides routing managers 1122 with each covering routing of a different domain. PAC/PSC 1102b provides a session manager 1138 and an AAA manager 1140. The session manager 1137 manages one or more sessions that correspond to one or more UE 108. A session allows a UE 302 to communicate with the network for voice calls and data. The AAA manager 1140 manages accounting, authentication, and authorization with an AAA server in the network. PAC/PSC 1102c provides a DPI task 1142 and a signaling demux 1144. The DPI task 1142 provides inspection of packet information beyond layer 4 for use and analysis by the network device. The signaling demux 1144 can provide scalability of services in combination with other modules. PAC/PSC 1102d provides redundancy through standby tasks 1146. Standby tasks 1146 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x76 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

The invention claimed is:

1. A network apparatus comprising:
at least one processor to communicate with one or more interfaces, the at least one processor to:
collect, from an Operation and Management (OAM) node associated with a wireless network, congestion information related to a user equipment (UE) within a cell of the wireless network;
determine, based on the collected congestion information, a congestion level associated with the wireless network cell; and
send, to a Mobility Management Entity (MME), an indication of the determined congestion level associated with the cell of the wireless network, wherein the MME is to modify, based on the indication of the determined congestion level associated with the cell of the wireless network, at least one Quality of Service (QoS) parameter associated with the UE within the cell of the wireless network.

2. The network apparatus of claim 1, wherein the UE further comprises a roaming UE.

3. The network apparatus of claim 1, wherein the MME is further configured to modify the at least one QoS parameter based on a policy table, wherein the indication of the determined congestion level associated with the cell of the wireless network is used to determine a modified QoS parameter from the policy table.

4. The network apparatus of claim 1, wherein the at least one QoS parameter comprise one or more of UE Aggregated Maximum Bitrate (UE-AMBR), Access Point Name Aggregated Maximum Bitrate (APN-AMBR) for non-Guaranteed Bitrate (GBR) bearers, and Maximum Bitrate (MBR) for Guaranteed Bitrate (GBR) bearers.

5. The network apparatus of claim 1, wherein the network apparatus is further configured to detect a change in the determined congestion level.

6. The network apparatus of claim 5, wherein the network apparatus is further configured to send, to the MME, an indication of the detected change in determined congestion level.

7. The network apparatus of claim 6, wherein the MME is further configured to restore the at least one QoS parameter to one or more values active before the indication of congestion level.

8. The network apparatus of claim 3, wherein the MME is further configured to modify the at least one QoS parameter to values received from a policy charging and rules function (PCRF) associated with the UE.

9. The network apparatus of claim 1, wherein the MME is further to determine, in response to receiving the indication of the determined congestion level, whether the UE is a roaming UE prior to modifying the at least one QoS parameter associated with the UE within the cell of the wireless network.

10. The network apparatus of claim 1, wherein the MME is to be located within a network visited by the UE and a PCRF of a home network of the UE is to establish the at least one QoS parameter prior to modification of the at least one QoS parameter by the MME.

11. A method for relieving congestion in a cell of a wireless network, comprising:
  collecting, from an OAM node associated with the wireless network, congestion information related to a user equipment (UE) within a cell of the wireless network;
  determining, by at least one processor, based on the collected congestion information, a congestion level associated with the wireless network cell; and
  sending, to the MME, an indication of the determined congestion level associated with the cell of the wireless network, wherein the MME is configured to modify, based on the indication of the determined congestion level associated with the cell of the wireless network, at least one QoS parameter associated with the UE within the cell of the wireless network.

12. The method of claim 11, wherein the UE further comprises a roaming UE.

13. The method of claim 11, wherein the MME is further configured to modify the at least one QoS parameter based on a policy table.

14. The method of claim 11, wherein the at least one QoS parameter comprise one or more of UE Aggregated Maximum Bitrate (UE-AMBR), Access Point Name Aggregated Maximum Bitrate (APN-AMBR) for non-Guaranteed Bitrate (GBR) bearers, and Maximum Bitrate (MBR) for Guaranteed Bitrate (GBR) bearers.

15. The method of claim 11, further comprising detecting a change in the determined congestion level.

16. The method of claim 15, further comprising sending, to the MME, an indication of the detected change in determined congestion level.

17. The method of claim 16, wherein the MME is further configured to restore the at least one QoS parameter to one or more values active before the indication of congestion level.

18. The method of claim 13, wherein the MME is further configured to modify the at least one QoS parameter to values received from a policy charging and rules function (PCRF) associated with the UE.

19. A non-transitory computer readable storage medium having stored thereon, computer executable instructions that, if executed by a computer system cause the computer system to perform a method for relieving congestion in a cell of a wireless network, comprising:
  collecting, from an OAM node associated with the wireless network, congestion information related to a user equipment (UE) within a cell of the wireless network;
  determining, based on the collected congestion information, a congestion level associated with the wireless network cell; and
  sending, to the MME, an indication of the determined congestion level associated with the cell of the wireless network, wherein the MME is configured to modify, based on the indication of the determined congestion level associated with the cell of the wireless network, at least one QoS parameter associated with the UE within the cell of the wireless network.

20. The computer readable storage medium of claim 19, wherein the UE further comprises a roaming UE.

21. The computer readable storage medium of claim 19, wherein the MME is further configured to modify the at least one QoS parameter based on a policy table.

22. The computer readable storage medium of claim 19, wherein the method further comprises detecting a change in the determined congestion level.

* * * * *